Sept. 19, 1961  C. J. CISLO  3,000,400
DUAL HEIGHT LEVELING VALVE FOR VEHICLE AIR SUSPENSION
Filed Feb. 27, 1959  2 Sheets-Sheet 1

INVENTOR.
Casimer J. Cislo
BY W. F. Wagner
ATTORNEY

Sept. 19, 1961 C. J. CISLO 3,000,400
DUAL HEIGHT LEVELING VALVE FOR VEHICLE AIR SUSPENSION
Filed Feb. 27, 1959 2 Sheets-Sheet 2

INVENTOR.
Caismer J. Cislo
BY
W. F. Wagner
ATTORNEY

United States Patent Office 3,000,400
Patented Sept. 19, 1961

3,000,400
DUAL HEIGHT LEVELING VALVE FOR VEHICLE AIR SUSPENSION
Casimer J. Cislo, Detroit, Mich., assignor to General Motors Corporation, Detroit, Mich., a corporation of Delaware
Filed Feb. 27, 1959, Ser. No. 796,067
5 Claims. (Cl. 137—627.5)

This invention relates to vehicle air suspension and more particularly to control apparatus therefor.

An object of the invention is to provide an improved air suspension system.

Another object is to provide an improved and simplified dual height leveling valve for air suspension systems.

A further object is to provide an air suspension system in which the volume of air contained in the air springs is controlled by a height sensing leveling valve adapted to provide two different predetermined vehicle clearance heights.

Still another object is to provide a dual height leveling valve capable of providing a selectively normal vehicle height clearance and an extended vehicle height clearance, the operation of the valve in the extended height position being accomplished by introduction of high pressure air into that part of the valve functioning as an exhaust outlet during normal height clearance operation.

A still further object is to provide a dual height leveling valve of the stated character wherein the valve elements are arranged in concentric relation and operate responsive to various axial displacement relationships.

These and other objects, advantages and features of the invention will become more fully apparent as reference is had to the accompanying specification and drawings wherein.

Figure 1:
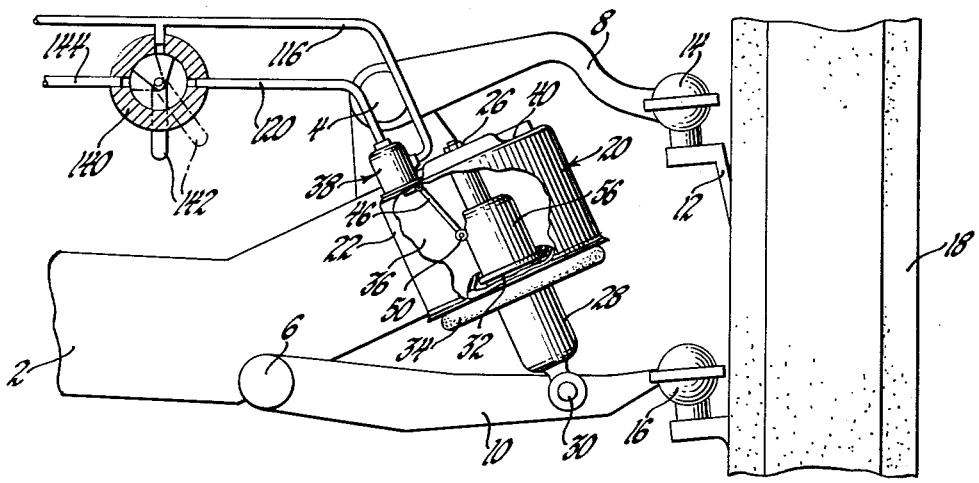
FIG. 1 is a fragmentary front elevational view of a portion of a vehicle suspension system incorporating the invention, certain parts being broken away and in section to more clearly illustrate the structure and relationship thereof.

Referring now to the drawings and particularly FIG. 1, reference numeral 2 designates generally a front cross frame member having pivotally attached thereto at 4 and 6 the inboard ends of a pair of vertically spaced upper and lower control arms 8 and 10. At their outboard ends, arms 8 and 10 are pivotally connected to a vertically extending wheel knuckle element 12 by means of ball joint assemblies 14 and 16. Frame 2 is resiliently supported with respect to dirigible wheel 18 by a pneumatic spring assembly 20. Assembly 20 includes a dome-like rigid structure 22 pivotally connected to frame 2 at 26. A hydraulic shock absorber 28 extends concentrically within dome 22 and has its upper end similarly connected to frame 2 at 26. The lower end of shock absorber 28, in turn, is pivotally connected to lower control arm 10 at 30. Extending between the lower open end of dome 22 and a veritcally intermediate annular shoulder 32 of shock absorber 28 is a flexible bellows 34.

In order to control movement of air into and out of the interior cavity 36 of spring assembly 20, there is provided a leveling valve assembly 38 which is secured to the outer surface of the upper wall portion 40 of dome 22. Dome 22 is provided with an aperture 42 (FIG. 2) which permits communication between cavity 36 and the interior 44 of valve assembly 38. Operation of leveling valve assembly 38 is accomplished by a lever 46 pivotally mounted on assembly 38 at 48 and having a depending free end portion provided with a roller 50 which abuttingly engages the stepped cam surfaces 52 and 54 on the vertical wall portion of shock absorber casing 56.

In accordance with the present invention, leveling valve assembly 38 comprises a cylindrical housing 58 having a cylindrical bore 60 extending vertically therethrough. At its upper end bore 60 is formed with counterbores 62, 64, and 66, each of which are of progressively increased diameter. Disposed in the upper open end of housing 58 is a cover member 68 having a flange 70 which seats in counterbore 66. Downwardly of flange 70, cover member 68 is provided with a pilot portion 72 which extends into counterbore 64 and is surrounded by a circular seal 74. Cover member 68 is permanently secured in the position shown by spinning over or clinching the upper extremity 76 of housing 58 into engagement with the upper wall of flange 70. Disposed in counterbore 62 and bore 60 is an annular element 78 of rubber-like material such as neoprene. Element 78 includes a plurality of vertically spaced circumferencial ribs 80, 82, 84, and 86 which resiliently engage the wall of counterbore 62 and bore 60. Bonded to the inner wall of element 78 is a sheet metal shell 88. At its lower end, shell 88 curves inwardly and is provided with a central opening 90, while the upper end thereof is formed with a radially extending shoulder 92 providing a seat for the upper flange 94 of a second annular rubber-like element 96, which extends downwardly in shell 88. Flange 94 of element 96 is secured against shoulder 92 by a sheet metal cap 98 having peripheral flange 100 crimped into the upper flange 102 of shell 88. Second annular element 96 is provided with a vertically intermediate annular flange 104 which resiliently engages the adjacent side wall of shell 88, while the lower end thereof is thickened in cross section to provide a bullet nose portion 106 which resiliently engages the lower end of shell 88 on the periphery of opening 90. A single small diameter passage 108 extends vertically through bullet nose portion 106 in concentric relation with opening 90 in shell 88. Passage 108 is normally closed by a finger-like extension 110 formed on laterally extending ledge portion 112 of lever 46, previously mentioned.

In order to provide for admission and exhaust of air from assembly 38, the side wall of housing 58 is formed with a flanged inlet port 114 which is adapted for connection with high pressure air line 116 (FIG. 1). Conversely, exhaust of air from assembly 38 is normally provided for by flanged exhaust port 118 which is adapted for connection to exhaust line 120. In order to regulate the rate of flow of air in and out of the assembly, port 114 communicates with the interior of the housing 58 via an orifice 122, while port 118 communicates therewith via orifice 124.

*Operation of the invention to achieve normal vehicle trim*

Figure 2:
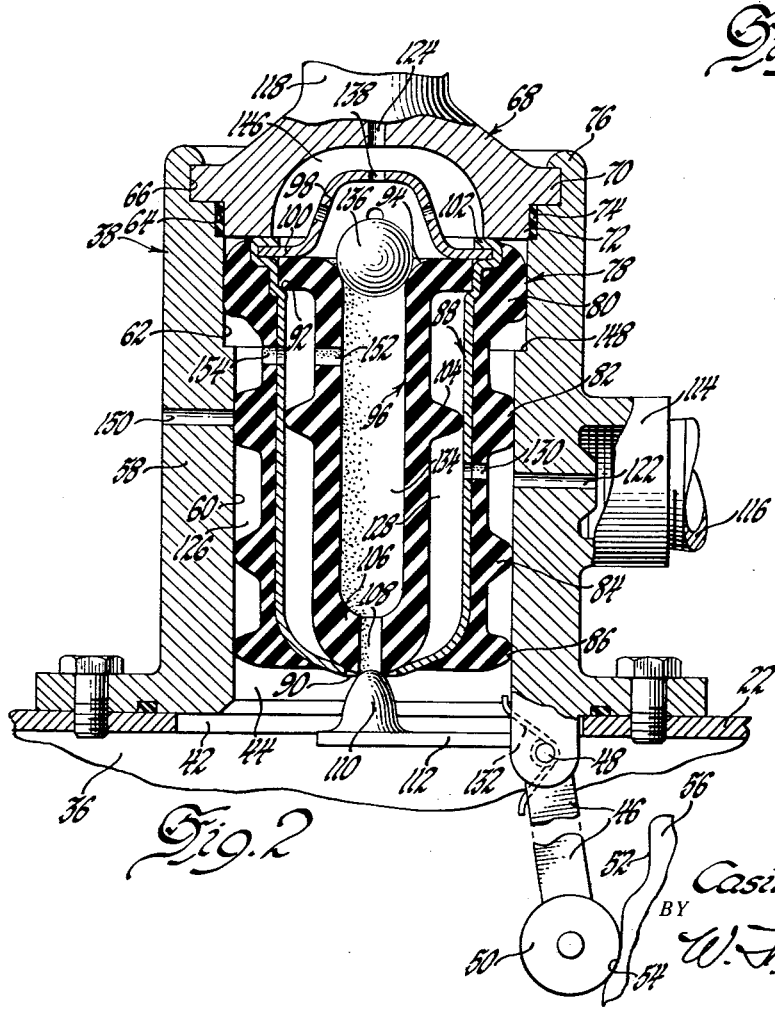
FIG. 2 is an enlarged sectional elevational view illustrating the details of construction of the leveling valve assembly incorporated in the suspension system of FIG. 1.

When the suspension assembly of FIG. 1 is in a position in which normal road clearance has been attained, components of leveling valve assembly 38 occupy the relative positions shown in FIG. 2. However, as soon as variation in road clearance occurs which causes frame 2 to descend relative to the ground, shock absorber casing 56 rises relative to dome 22 with the result that lever 46 moves toward the left under the influence of the shoulder at the base of cam surface 54 on shock absorber casing 56. Leftward movement of lever 46 causes finger-like extension 110 to move upwardly, thereby displacing bullet nose portion 106 from engagement with the peripheral wall surrounding opening 90 in shell 88, whereupon high pressure air enters the interior cavity 126 surrounding outer rubber-like element 78 between flanges 82 and 84, High pressure air then enters the cavity 128 between shell 88 and second rubber-like element 96 through fixed orifice 130. Since nose portion 106 is now displaced from the lower end of shell 88, high pressure air emerges through opening 90 into the interior 36 of the air spring, causing expansion thereof until shock absorber housing 56 has been displaced downwardly relative to dome 22 sufficiently to permit lever 46 to be moved to the right against cam surface 54 and allow nose portion 106 to re-engage the lower end of shell 88. Conversely, if the frame 2 has ascended to a position in excess of the normal trim height, shock absorber housing 56 will have moved downwardly relative to dome 24 sufficiently to permit lever 42 to move toward the right against cam surface 52 under the influence of torsion spring 132 until passage 108 in nose portion 106 is placed in communication with the interior of the spring, thereby allowing air to emerge from the spring into the inner cavity 134 of element 96 from which it displaces ball check valve 136, emerges through openings 138 in cap structure 98 and passes to exhaust conduits 120 through orifice 124.

*Operation of invention to achieve extended vehicle trim*

Figure 3:
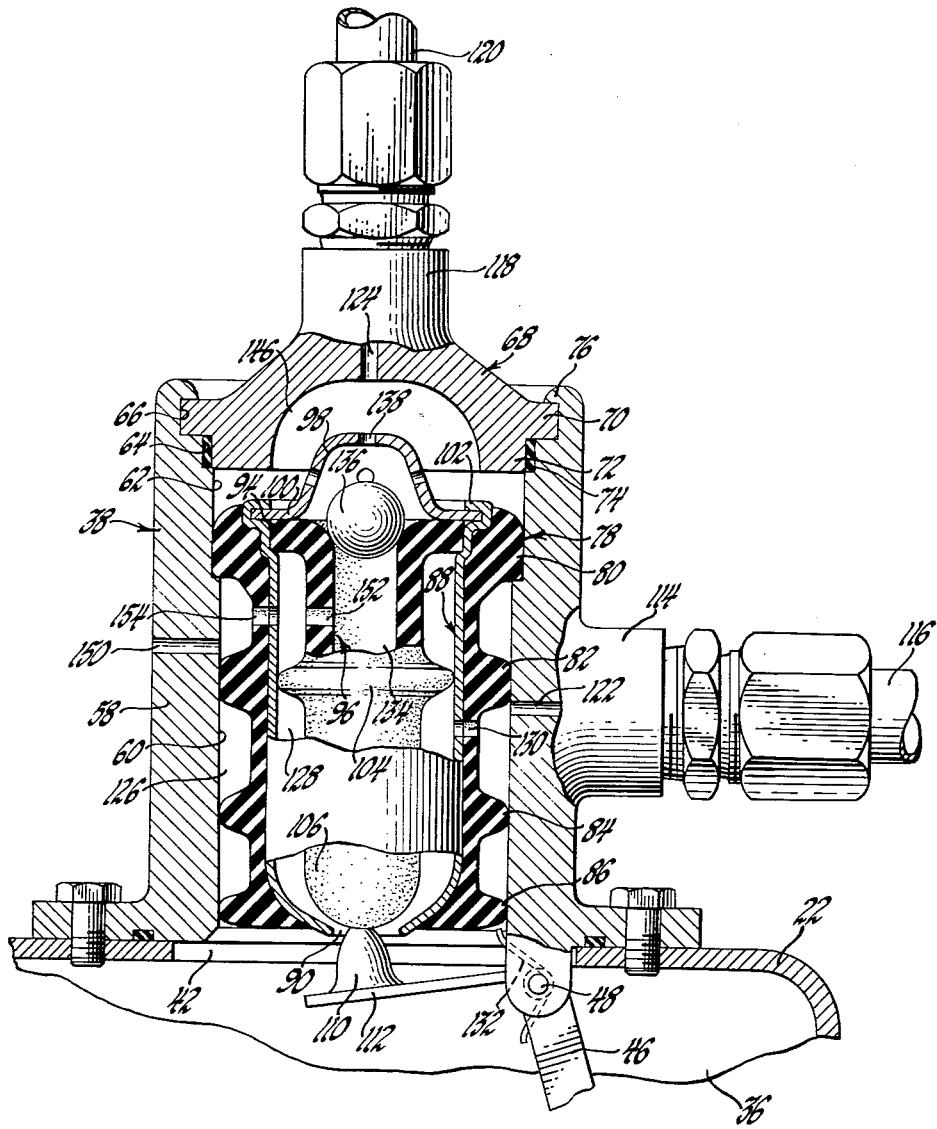
FIG. 3 is a view similar to FIG. 2 showing the relationship of the parts when the valve is operating to provide an extended vehicle trim height.

Assuming now that the operator desires to raise the vehicle height clearance, valve 140 (FIG. 1) is manipulated by lever 142 so as to place the intake and exhaust conduit 116 and 120 in communication, while blocking the upstream portion 144 of the exhaust conduit portion. This operation results in introducing high pressure air into that portion of the exhaust conduit extending between valve 140 and leveling valve assembly 38, which in turn creates a pressure increase in the cavity 146 below cover member 68. The increased pressure therein causes check valve 136 to seat firmly and thereafter exerts a downward pressure on outer rubber-like element 78 which moves downwardly until the lower surface of upper flange 80 thereof abuts the ledge 148 at the base of counterbore 62. As seen in FIG. 3, downward movement of element 78 causes the intermediate flange 82 thereof to uncover orifice 150 communicating with atmosphere. At the same time, the nose portion 106 is caused to move upwardly relative to the lower end of shell 88 owing to the fixed position of finger portion 110 on lever 46. As a result, high pressure air passes from inlet orifice 122 through aperture 130 and downwardly into spring cavity 36 through opening 90, until the pressure in spring 20 displaces piston 28 downwardly relative to dome 22, causing lever 46 to swing to the right and allow nose portion 106 to re-engage the lower end of shell 88. Should the vehicle sprung mass ascend beyond the desired extended height position, roller 50 moves upwardly out of contact with cam surface 52 and to the right under the influence of spring 132. As a result, finger portion 110 moves downwardly away from aperture 108 thereby permitting air to emerge from the spring into cavity 134 through aperture 152 in the wall of rubber-like element 96, through the aperture 154 in shell 88 and outer rubber-like element 78 and thence to atmosphere through orifice 150 in housing 58.

To restore the vehicle to normal trim height, lever 142 of valve 140 is returned to the normal position which immediately allows the pressure in cavity 146 to exhaust to atmosphere through conduits 126 and 144. Since the pressure in cavity 146 will thereafter be much lower than the pressure in spring cavity 36, the resulting pressure differential will act upon outer rubber-like element 78, urging it to slide vertically in housing 58 and return to the position shown in FIG. 2. Since this will cause nose portion 106 to be displaced relative to finger member 110, exhaust of air from spring cavity 36 will take place through aperture 108 until the vehicle is restored to its normal trim height after which the first described sequence of operation will resume.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a device of the class described, a fixed housing having a main cylindrical bore, an inlet port and an exhaust port formed in said housing, an annular member slidably disposed in said bore and normally maintained in a first axial position, said annular member having a main cylindrical cavity terminating in a curved end wall, said end wall having an aperture extending therethrough in axial alignment with said cavity, a flexible tubular element disposed in said cavity, said element having a thickened nose portion yieldably engaging said end wall and normally closing said aperture, a passage in said nose portion communicating with the interior of said tubular element, a lever pivoted on said housing, operating means on said lever engaging said thickened nose portion acting to displace said nose portion from said end wall and open said aperture upon swinging movement of said lever in one direction and to close said aperture and open said passage upon swinging movement of said lever in the opposite direction, said lever occupying a first predetermined neutral angular position when said operating means engages said nose portion without displacing the same from said end wall, and pressure responsive means effective to displace said annular member to a second axial position whereby said lever is angularly displaced to a second predetermined neutral position when said operating means engages said nose portion without displacing the latter from said end wall.

2. In a device of the class described, a fixed housing having a main cylindrical bore, an inlet port and an exhaust port formed in said housing, a resilient annular member slidably disposed in said bore and normally maintained in a first axial position, said annular member having a main cylindrical cavity terminating in a curved end wall, said end wall having an aperture extending therethrough in axial alignment with said cavity, a flexible tubular element disposed in said cavity, said element having a thickened nose portion yieldably engaging said end wall and normally closing said aperture, a passage in said nose portion communicating with the interior of said tubular element, a lever pivoted on said housing, operating means on said lever engaging said thickened nose portion acting to displace said nose portion from said end wall and open said aperture upon swinging movement of said lever in one direction and to close said aperture and open said passage upon swinging movement of said lever in the opposite direction, said lever occupying a first predetermined neutral angular position when said operating means engages said nose portion without displacing the same from said end wall, and means for exerting pressure through said exhaust port to displace said annular member to a second axial position whereby said lever is angularly displaced to a second predetermined neutral position when said operating means engages said nose portion without displacing the latter from said end wall.

3. In a device of the class described, a fixed housing having a main cylindrical bore, an inlet port and an exhaust port formed in said housing, a resilient annular member slidably disposed in said bore and normally maintained in a first axial position, said annular member having a main cylindrical cavity terminating in a curved end wall, said end wall having an aperture extending therethrough in axial alignment with said cavity, a flexible tubular element disposed in said cavity, said element having a thickened nose portion yieldably engaging said end wall and normally closing said aperture, a passage in said nose portion communicating with the interior of said tubular element, a lever pivoted on said housing, operating means on said lever engaging said thickened nose portion acting to displace said nose portion from said end wall and open said aperture upon swinging movement of said lever in one direction and to close said aperture and open said passage upon swinging movement of said lever in the opposite direction, said lever occupying a first predetermined neutral angular position when said operating means engages said nose portion without displacing the same from said end wall, means for exerting pressure through said exhaust port to displace said annular member to a second axial position whereby said lever is angularly displaced to a second predetermined neutral position when said operating means engages said nose portion without displacing the latter from said end wall, and means for establishing an auxiliary exhaust path from said housing responsive to movement of said member to the second axial position.

4. In a device of the class described, a fixed housing having a main cylindrical bore, an inlet port and an exhaust port formed in said housing, a pressure conduit connected to said inlet port, an exhaust conduit connected to said exhaust port, an elastomeric annular member slidably disposed in said bore and normally maintained in a first axial position, said annular member having a plurality of vertically spaced external circumferential ribs and an internal cylindrical cavity terminating in a curved end wall, said end wall having an inlet aperture extending therethrough in axial alignment with said cavity, a passage in the wall of said member providing commuciation between said cavity and said inlet port, a flexible tubular element disposed in said cavity, the upper end of said element being formed with a flange secured to said annular member and the lower end having a thickened nose portion yieldably engaging said end wall and normally closing said aperture, an exhaust passage in said nose portion communicating with the interior of said tubular element, means providing communication between the interior of said element and said exhaust port, a lever pivoted on said housing, operating means on said lever engaging said thickened nose portion acting to displace the latter from said end wall and open said inlet aperture upon swinging movement of said lever in one direction and to close said aperture and open said passage upon swinging movement of said lever in the opposite direction, said lever occupying a first predetermined neutral angular position when said operating means engages said nose portion without displacing the same from said end wall, at a remote valve placing the same from said end wall, means cross connecting said pressure conduit and exhaust conduit, a remote valve disposed in said cross connecting means having a first position closing said cross connection and a second position opening said cross connection, and a check valve adapted to close the interior of said tubular element responsive to pressure in said exhaust port whereby said pressure acts to displace said annular member to a second axial position causing said lever to be angularly displaced to a second predetermined neutral position when said operating means engages said nose portion without displacing the latter from said end wall.

5. In a device of the class described, a fixed housing having a main cylindrical bore, an inlet port and an exhaust port formed in said housing, a pressure conduit connected to said inlet port, an exhaust conduit connected to said exhaust port, an elastomeric annular member slidably disposed in said bore and normally maintained in a first axial position, said annular member having a plurality of vertically spaced external circumferential ribs and an internal cylindrical cavity terminating in a curved end wall, said end wall having an inlet aperture extending therethrough in axial alignment with said cavity, a passage in the wall of said member providing communication between said cavity and said inlet port, a flexible tubular element disposed in said cavity, the upper end of said element being formed with a flange secured to said annular member and the lower end having a thickened nose portion yieldably engaging said end wall and normally closing said aperture, an exhaust passage in said nose portion communicating with the interior of said tubular element, means providing communication between the interior of said element and said exhaust port, a lever pivoted on said housing, operating means on said lever engaging said thickened nose portion acting to displace the latter from said end wall and open said inlet aperture upon swinging movement of said lever in one direction and to close said inlet aperture and open said exhaust passage upon swinging movement of said lever in the opposite direction, said lever occupying a first predetermined neutral angular position when said operating means engages said nose portion without displacing the same from said end wall, a remote valve cross connecting said pressure conduit and said exhaust conduit, a check valve in said housing engaging one end of said tubular element responsive to pressure in said exhaust port whereby said pressure acts to displace said annular member to a second axial position causing said lever to be angularly displaced to a second predetermined neutral position when said operating means engages said nose portion without displacing the latter from said end wall, and an auxiliary exhaust port in the wall of said housing normally closed by one of the circumferential ribs on said annular member, but opened responsive to movement of the latter to the second axial position.

References Cited in the file of this patent

UNITED STATES PATENTS

| | | |
|---|---|---|
| 1,914,814 | Mercier | June 20, 1933 |
| 2,733,931 | Reid et al. | Feb. 7, 1956 |

FOREIGN PATENTS

| | | |
|---|---|---|
| 893,857 | France | Feb. 23, 1944 |

UNITED STATES PATENT OFFICE
CERTIFICATE OF CORRECTION

Patent No. 3,000,400            September 19, 1961

Casimer J. Cislo

It is hereby certified that error appears in the above numbered patent requiring correction and that the said Letters Patent should read as corrected below.

Column 5, lines 46 and 47, strike out "at a remote valve placing the same from said end wall,".

Signed and sealed this 20th day of February 1962.

(SEAL)
Attest:

ERNEST W. SWIDER            DAVID L. LADD
Attesting Officer            Commissioner of Patents